US008122820B2

(12) United States Patent
Conti et al.

(10) Patent No.: US 8,122,820 B2
(45) Date of Patent: Feb. 28, 2012

(54) FOOD PROCESSOR WITH DICING TOOL

(75) Inventors: Michael P. Conti, Saint Joseph, MI (US); Keeley M. Kabala, Elgin, IL (US)

(73) Assignee: Whirlpool Corporation, Benton Harbor, MI (US)

(*) Notice: Subject to any disclaimer, the term of this patent is extended or adjusted under 35 U.S.C. 154(b) by 571 days.

(21) Appl. No.: 12/339,290

(22) Filed: Dec. 19, 2008

(65) Prior Publication Data

US 2010/0154658 A1    Jun. 24, 2010

(51) Int. Cl.
*A47J 43/046* (2006.01)
*B26D 3/22* (2006.01)
*B26D 3/18* (2006.01)

(52) U.S. Cl. ...... 99/509; 241/37.5; 241/92; 241/101.01; 83/428.1; 83/865; 83/932; 30/303

(58) Field of Classification Search ............ 99/510, 99/511, 509; 241/92, 101.1, 282.1; 83/663, 83/932, 37.5, 101.01; 30/124, 303, 305, 30/299
See application file for complete search history.

(56) References Cited

U.S. PATENT DOCUMENTS

| 1,449,040 A * | 3/1923 | Hany ............................ 83/425.1 |
| 3,664,396 A * | 5/1972 | Tremblay ....................... 425/152 |
| 4,190,208 A | 2/1980 | Schaeffer et al. |
| 4,199,112 A | 4/1980 | McLean |
| 4,256,265 A | 3/1981 | Madan |
| 4,369,680 A | 1/1983 | Williams |
| 4,456,185 A | 6/1984 | Ribassin et al. |
| 5,445,332 A | 8/1995 | Shimizu et al. |
| 6,035,771 A | 3/2000 | Conran et al. |
| 6,364,226 B1 | 4/2002 | Kubicko |
| 6,467,948 B1 | 10/2002 | Lawson |
| 6,539,847 B2 | 4/2003 | Wong |
| 7,137,581 B2 | 11/2006 | Takayama et al. |
| 7,461,801 B2 * | 12/2008 | Chang ........................ 241/37.5 |
| 2004/0060414 A1 * | 4/2004 | Sundqvist ...................... 83/663 |
| 2007/0006739 A1 | 1/2007 | Fevre |
| 2007/0095189 A1 * | 5/2007 | Williams ..................... 83/651.1 |
| 2008/0017737 A1 | 1/2008 | So et al. |

FOREIGN PATENT DOCUMENTS

| DE | 10057835 A1 | 8/2002 |
| FR | 2548573 A1 | 1/1985 |

* cited by examiner

*Primary Examiner* — Reginald L Alexander
(74) *Attorney, Agent, or Firm* — McGarry Bair PC; Tara M. Hartman

(57) ABSTRACT

A food processor defining a food processing path through which are movable a cutting tool and a dicing tool for processing a food item. The dicing tool has multiple dicing elements selectively movable through the food processing path, between the cutting tool and the receptacle, to dice the food cut by the cutting tool.

27 Claims, 6 Drawing Sheets

FOOD PROCESSOR WITH DICING TOOL

BACKGROUND OF THE INVENTION

Food processors are used to prepare food items by conducting a processing operation, such as slicing, dicing, grating, or shredding, on the food item. Each processing operation is conducted by a different processing tool, which must be replaced when switching between each processing operation. The processing tool is also switched when different size food items are desired for the same processing operation.

SUMMARY OF THE INVENTION

A food processor defining a food processing path through which are movable a cutting tool and a dicing tool for processing a food item. The dicing tool has multiple dicing elements selectively movable through the food processing path, between the cutting tool and the receptacle, to dice the food cut by the cutting tool.

DESCRIPTION OF THE EMBODIMENTS OF THE INVENTION

Figure 1:
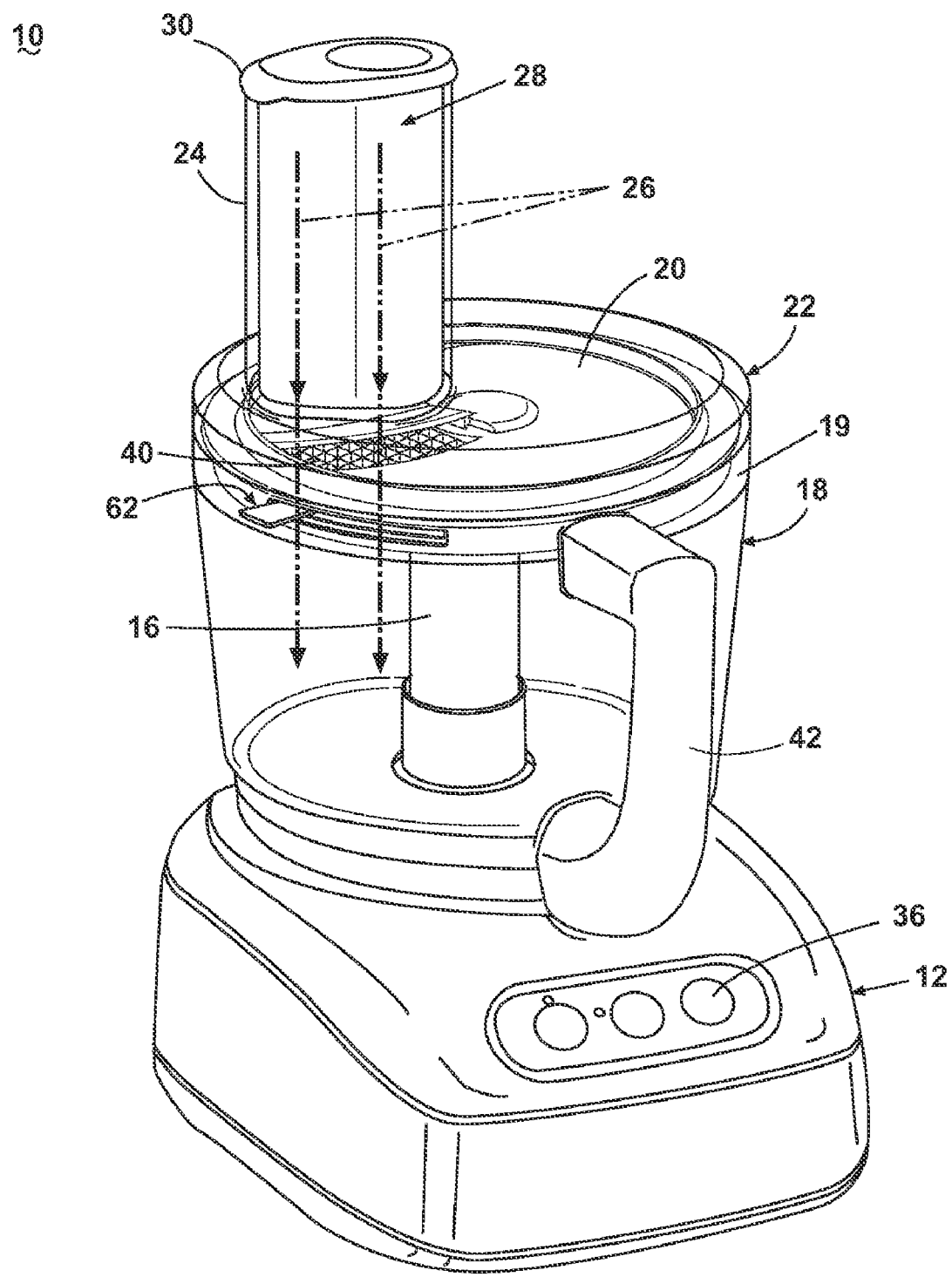
FIG. 1 is a perspective view of a food processor according to a first embodiment of the invention.

Referring now to the figures, FIG. 1 illustrates a food processor 10 according to one embodiment of the invention. The food processor 10 shares many features of a conventional food processor, which will not be described in detail herein except as necessary for a complete understanding of the invention. The food processor 10 includes a base 12 of the food processor 10. The base 12 may include a motor 14 (FIG. 2) having an output shaft 16. A receptacle or a bowl 18 for receiving the processed food, usually made of transparent plastic is supported on the base. The bowl 18 terminates in an open top defined by a lip 19.

A removable lid 22 may be removably received on the bowl 18. Thus, the bowl 18 may be closed by the lid 22, which may be removably secured to the bowl 18 by a snap-fit, a twist-lock arrangement, or any other suitable means of attachment. The bowl 18 and lid 22 may collectively form a food processing chamber. A feed tube 24 extends upwardly from the lid 22. A food pusher 28 may be sized to slide through the feed tube 24 and may be used to push food items through the feed tube 24. A stop, in the form of a flange 30, is provided on the food pusher 28 to limit the insertion of the food pusher 28 into the feed tube 24. The bowl 18 and lid 22 are illustrated as being transparent, but they need not be.

The bowl 18, lid 22, and feed tube 24 can be collectively referred to as a housing into which the food is introduced and processed. It is also possible for the base 12 to part of the housing. However, in the illustrated embodiment, the housing is supported by the base 12.

A cutting tool 20 and dicing tool 40 are located within the housing. As illustrated, the cutting tool 20 is supported on the output shaft 16 and the dicing tool 40 is supported by the bowl 18, such as by press-fitting into the open top of the bowl 18.

Figure 2:
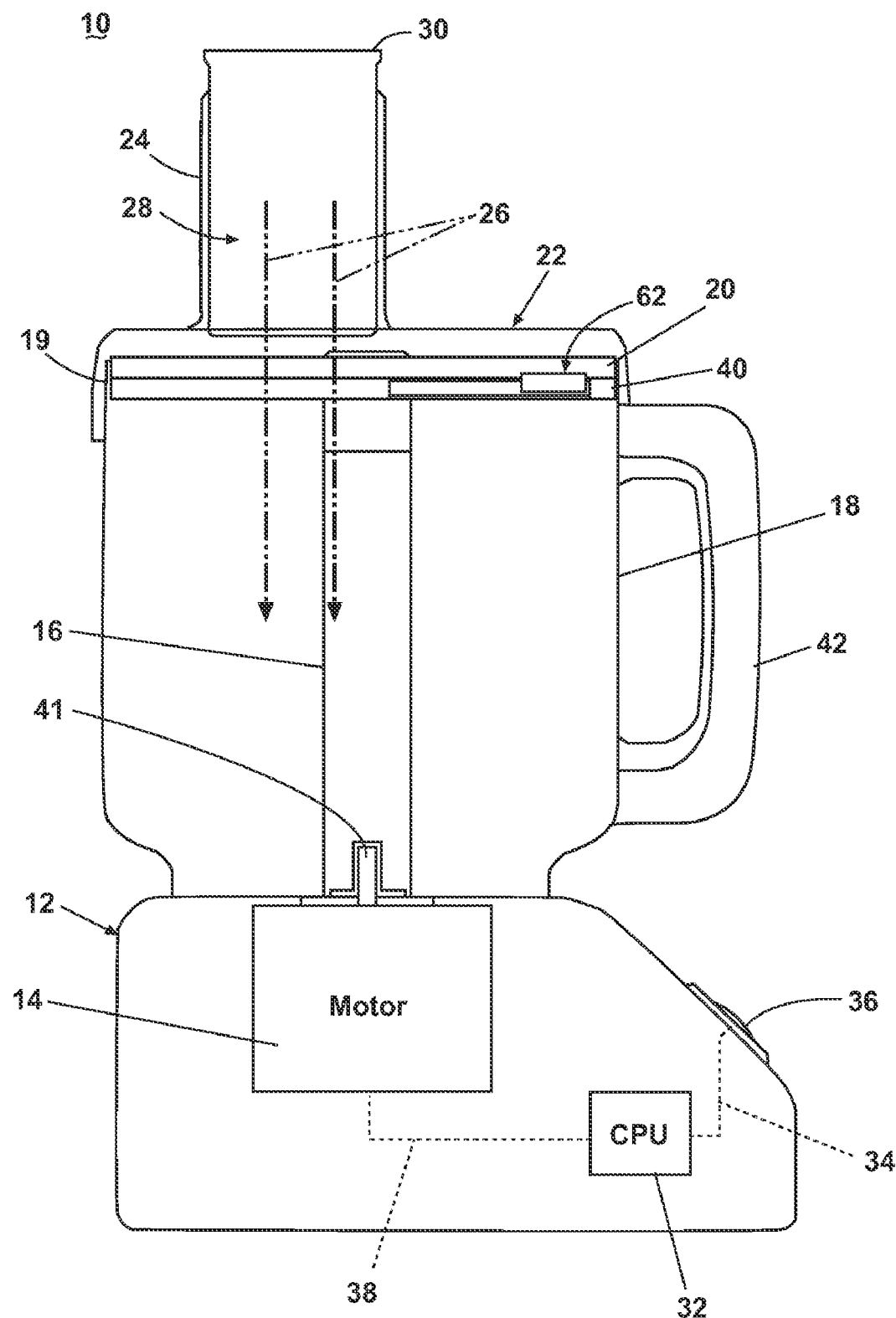
FIG. 2 is a schematic view of the food processor of FIG. 1 illustrating a food processing path through the food processor and its relationship with a cutting tool and dicing tool.

Referring to FIG. 2, a food processing path 26, illustrated by the spaced, dashed line, extends through the housing. The feed tube 24 forms an inlet to and part of the food processing path 26. In this case, the lid 22 and feed tube 24 act as a food guide or a food chute configured to receive food for processing. The food processing path 26 extends from the feed tube 24 through the cutting tool 20 and a portion of the dicing tool 40. The food processing path 26 ends when the processed food is deposited in the bowl 18.

A control system may be provided for controlling the operation of the food processor 10. The control system as illustrated includes a controller 32, which is electrically coupled through a user interface lead 34 to a user interface or control panel 36. The control panel 36 may be provided on the base 12 and may include operational controls such as dials, lights, switches, and displays enabling a user to control the operation of the food processor 10. The motor 14 may be electrically coupled through a control lead 38 to the controller 32. The food processor 10 may be preprogrammed with a number of different food processing options from which a user may select a food processing option to process a food item.

Figure 3:
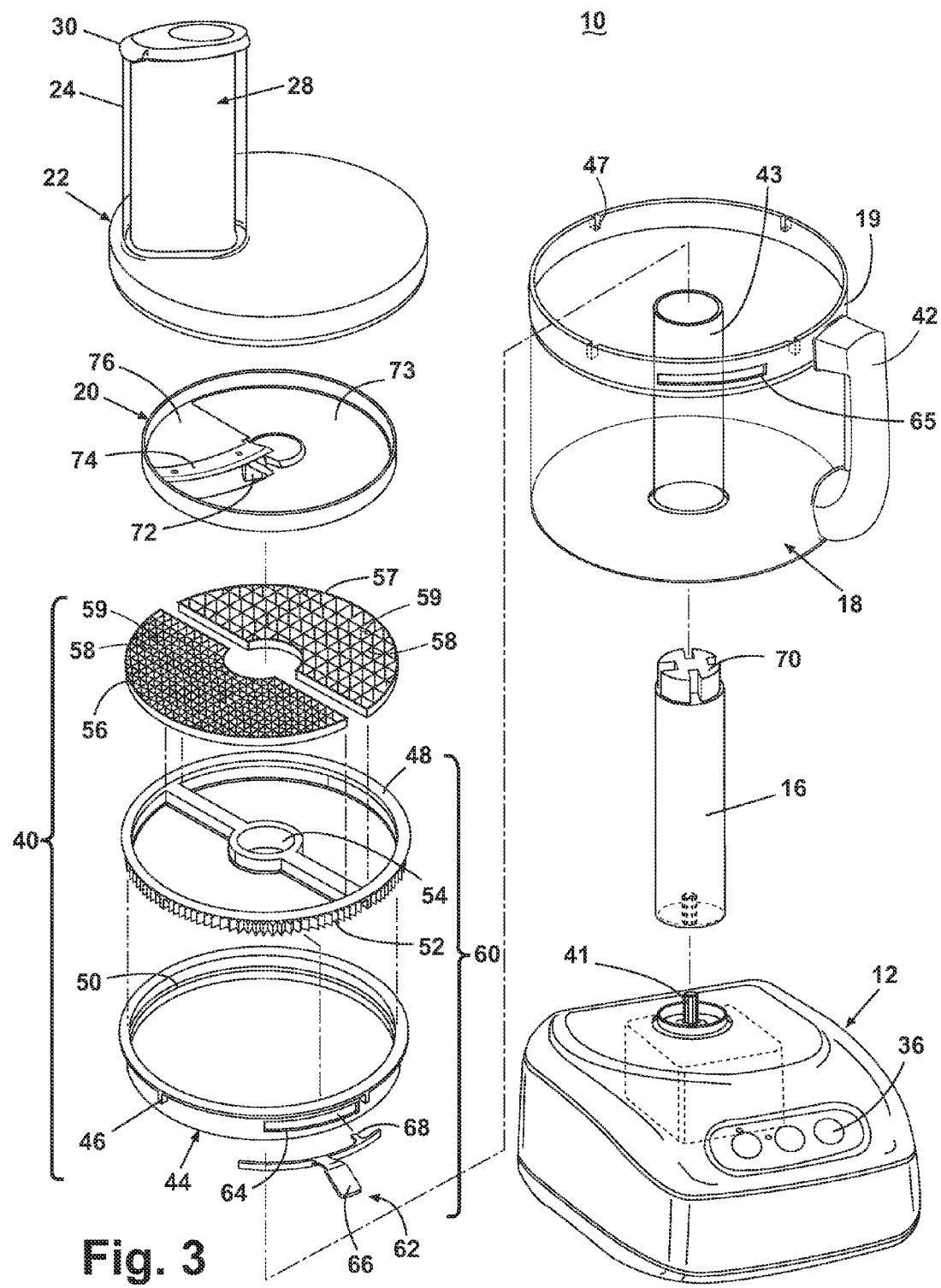
FIG. 3 is an exploded view of the food processor of FIG. 1.

With reference to FIG. 3, the different elements of the food processor 10 will be described in greater detail. A drive shaft 41 extends from the base 12. The drive shaft 41 is operably coupled with the motor 14, and may be used to provide rotational movement to the output shaft 16 that extends into the food processing chamber formed by the bowl 18 and the lid 22.

A handle 42 is provided on the bowl 18 so that a user may more easily maneuver the bowl 18. A guide 43 projects into the bowl 18. The output shaft 16 is received within the guide 43. The bowl 18 may be secured onto the base 12 and around the output shaft 16 by a snap-fit, a twist lock arrangement, or any other suitable means of attachment.

The cutting tool 20 is illustrated as being a rotatable cutting disc having a planar portion 73. A cutting blade 74 is provided above the planar portion 73 and acts to cut food as the cutting tool 20 is rotated through the food processing path 26. A ramp portion 76 slopes from the cutting blade 74 to the planar portion 73. The ramp portion 76 acts to push the cut food through the dicing tool 40 after it has been cut by the cutting tool 20. The cutting tool 20 and cutting blade 74 may be made of metal or any other suitable material.

The cutting tool 20 may be operably coupled to the output shaft 16 above the dicing tool 40. The cutting tool 20 has a hub 72 that is complementarily keyed to mate with the upper end 70 of the output shaft 16 such that rotation of the output shaft 16 will rotate the cutting tool 20. The cutting tool 20 is selectively moveable through the food processing path 26 and the cutting blade 74 acts to cut food as it passes through the food processing path 26.

The dicing tool 40 may include a frame 44 having keys 46, a rotatable body 48, and multiple dicing elements 56, 57 carried by the rotatable body 48. The frame 44 is a ring frame having keys 46 that locate the dicing tool 40 within the bowl 18. The frame 44 may have a channel 50 on its inner surface.

The rotatable body 48 of the dicing tool 40 is a disc with dicing elements 56, 57 formed in it and a central portion 54 capable of receiving the output shaft 16. It is contemplated that the dicing tool 40 may have more than two dicing elements. Each dicing element will typically have different processing functionality.

The dicing elements 56, 57 are illustrated as grids removably mounted in the rotatable body 48 and having intersecting cutting elements 57 defining openings 58. As illustrated, the dicing element 56 has smaller openings 58 and has a processing capability of finely dicing a food item. The dicing element 57 has larger openings 58 and has a processing capability of cubing a food item. The openings 58 may be of any shape including circular or oval. Alternatively, the dicing tool 40 may have alternative functions or have another processing capability on the same tool. The dicing element 56 and the dicing element 57 may be made of metal or any material suitable for processing food items.

The dicing tool 40 may also include a drive mechanism 60 coupled to the dicing tool 40 to selectively move the dicing elements 56, 57 relative to the frame 44 to selectively move the dicing elements 56, 57 through the food processing path 26. The drive mechanism 60 as illustrated is a ratchet mechanism formed by a series of teeth 52 projecting from the outer edge of the rotatable body 48 and a pawl 62. The manually-actuable lever or pawl 62 includes a handle 66 and a finger 68 for engaging the teeth 52. The finger 68 operably couples the pawl 62 to the rotatable body 48. The finger 68 selectively engages the teeth 52 formed along the outer edge of the rotatable body 48. With this configuration, the ratchet mechanism may be operated to provide the user with the ability to control which functionality of the dicing tool 40, in this case either the first dicing element 56 or the second dicing element 57, is located in the food processing path 26. Thus, the multiple dicing elements 56, 57 are selectively movable under the feed tube 24 and through the food processing path 26.

The pawl 62 may extend through a space 64 in the frame 44 and a space 65 in the bowl 18 such that the user may access the handle 66 and may move and align the desired portion of the dicing tool 40 under the feed tube 24. The rotatable body 48 may be rotatably mounted in the channel 50 and operably coupled to the pawl 62. The output shaft 16 may go through the central portion 54 of the dicing tool 40 and the dicing tool 40 may be received within the lip 19 of the bowl 18. The keys 46, and corresponding keyways 47 on the bowl 18, locate the dicing tool 40 within the bowl 18. More specifically, at least a portion of the frame 44 is press-fit against the lip 19. Alternatively, the dicing tool 40 may be mounted to the lid 22.

Regarding the operation of the food processor 10, after the bowl 18 is positioned on the base 12 and the drive shaft 41 and output shaft 16 are coupled, a user may place the dicing tool 40 within the lip 19 of the bowl 18 by placing it over the upper end 70 of the output shaft 16. The user may then place the cutting tool 20 on the upper end 70 of the output shaft 16. The user may then position the lid 22 on the bowl 18 and deliver food through the feed tube 24 into the bowl 18.

The user may then activate the motor 14 causing the drive shaft 41, output shaft 16, and cutting tool 20 to rotate. The food may be pushed down to the cutting tool 20 using the food pusher 28 where the food then contacts the cutting blade 74, at which point it is sliced and then it is pushed by the ramp portion 76 through the dicing tool 40 and into the bowl 18. Depending on which of the openings 58 of the dicing tool 40 are in the food processing path 26, the dicing tool 40 may yield diced or cubed bits of food.

The dicing tool 40 and dicing elements 56, 57 are selectively movable through the food processing path 26, between the cutting tool 20 and the bowl 18, to dice the food cut by the cutting tool 20. A user may change which dicing element is in the food processing path by operating the pawl 62.

Figure 4:
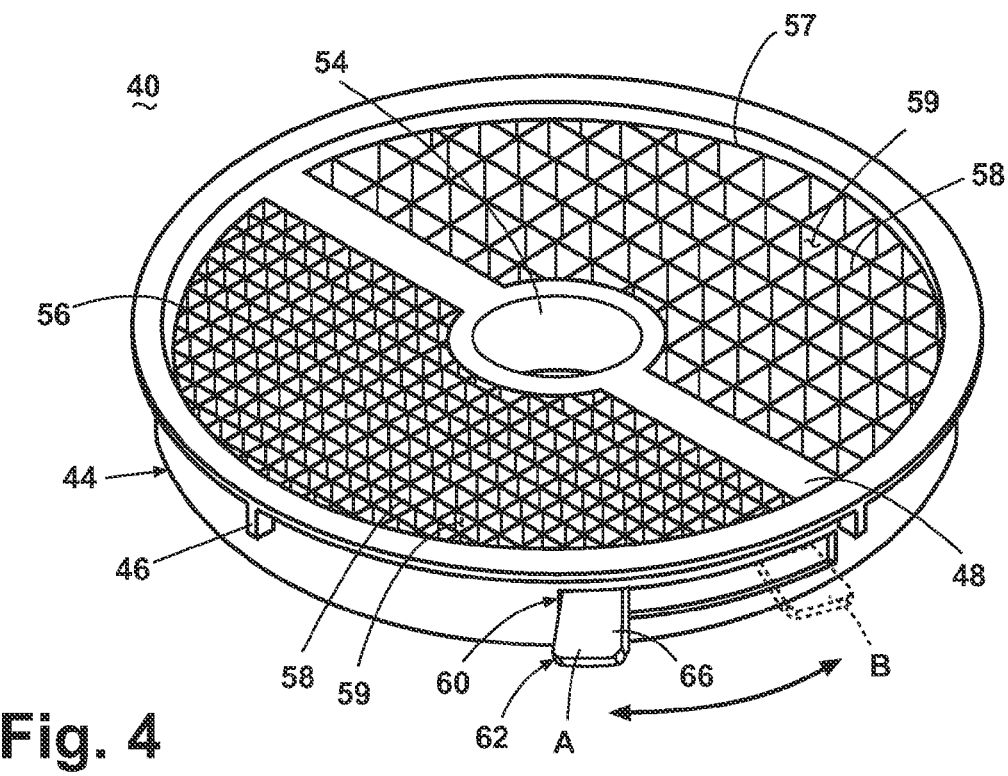
FIG. 4 is a partial perspective view of the dicing tool of the food processor of FIG. 1
Figure 5:
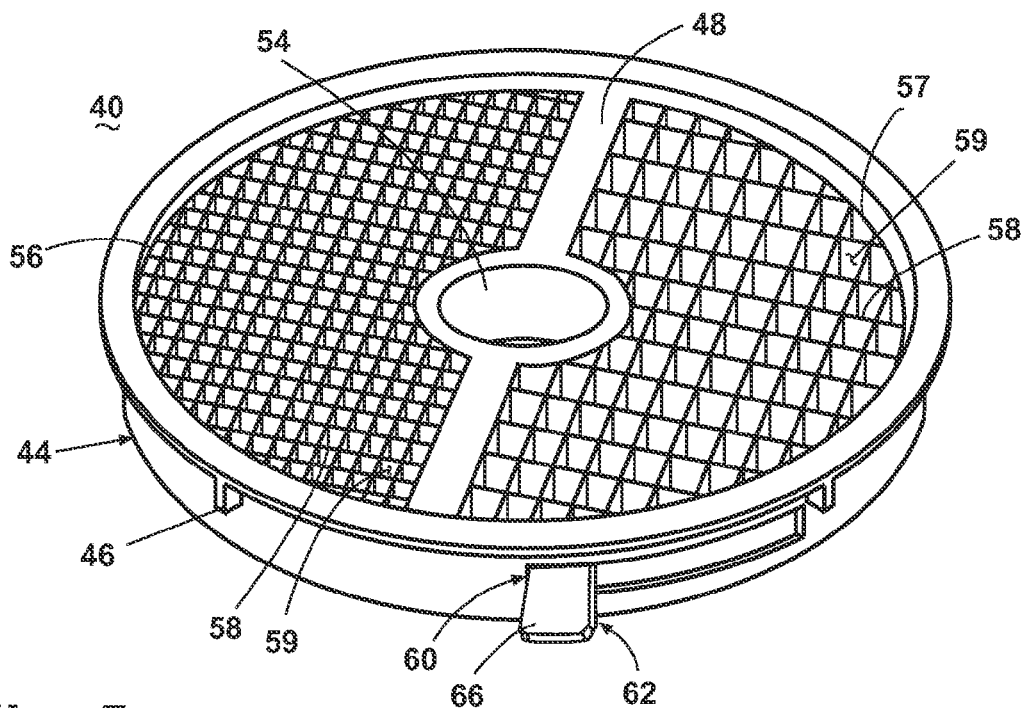
FIG. 5 is a second partial perspective view of the dicing tool of the food processor of FIG. 1

FIG. 4 illustrates the range of motion for the handle 66 of the ratchet mechanism to effect the selective movement of the dicing elements 56, 57 through the food processing path 26. A user may manually move the handle 66 from a first position A to a second position B (shown in phantom). When the handle 66 is moved to the second position B, the resilient nature of the finger 68 and its orientation causes the finger 68 to be drawn up and over several of the teeth 52 on the rotatable body 48 without resulting in the rotation of the rotatable body 48. As the finger 68 is moved to position B the resilent nature of the finger 68 causes it to catch against one of the teeth 52. As the pawl 62 is moved back to position A the finger 68, still caught against one of the teeth 52, causes the rotatable body 48 to rotate with the pawl 62 to the position shown in FIG. 5.

As can easily be seen, the handle 66 of the pawl 62 has only a predetermined range of motion between position A and position B. The range of motion is indexed relative to the dicing elements 56, 57 to effect a sixty degree change of the positioning of the dicing elements 56, 57 within the food processing path 26. Thus, for the illustrated embodiment, to change from the first dicing element 56 in the food processing path 26 to the second dicing element 57 in the food processing path 26 the pawl 62 must be manually-actuated to the full extent of its range three times by the user. However, depending on the number and/or size of the dicing elements and the range of travel of the lever, the number of manual actuations will vary. For convenience of the user, it is contemplated that the range of travel of the lever will be an integer multiple of the degree of rotation needed to move the dicing element into the processing path to effect an indexing relationship therebetween.

Figure 6:
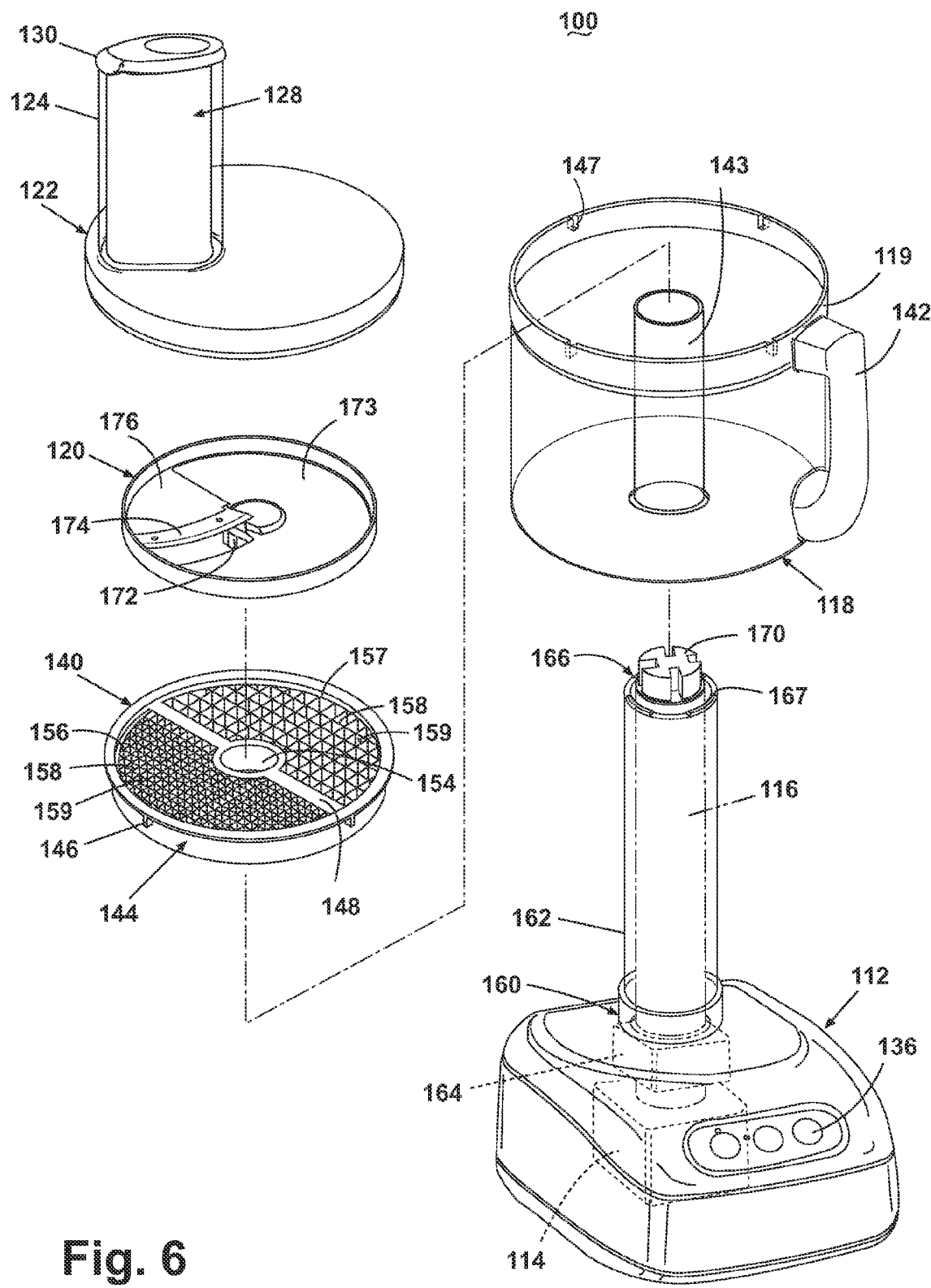
FIG. 6 is an exploded view of a food processor according to a second embodiment of the invention.

FIG. 6 is a schematic view of a food processor 100, dicing tool 140, and drive mechanism 160 according to a second embodiment of the invention. The second embodiment 100 is similar to the first embodiment 10. Therefore, like parts will be identified with like numerals increased by 100, with it being understood that the description of the like parts of the first embodiment applies to the second embodiment, unless otherwise noted.

One difference between the first embodiment 10 and the second embodiment 100 is that the drive mechanism 160 is automatic instead of manually actuable. The drive mechanism 160 includes a coupler that may be selectively coupled to the rotatable body 148 to move the desired dicing element 156, 157 into the processing path 126. The coupler may be formed from a shaft sleeve 162, a solenoid motor 164, and a coupling mechanism 166.

The shaft sleeve 162 is slidably mounted to the output shaft 116 for axial movement along the output shaft 116. The solenoid motor 164 may be actuated by the controller 132 to selectively raise and lower the output shaft sleeve 162 along the output shaft 116. Alternative actuators such as a servo motor may be used.

Figure 7:
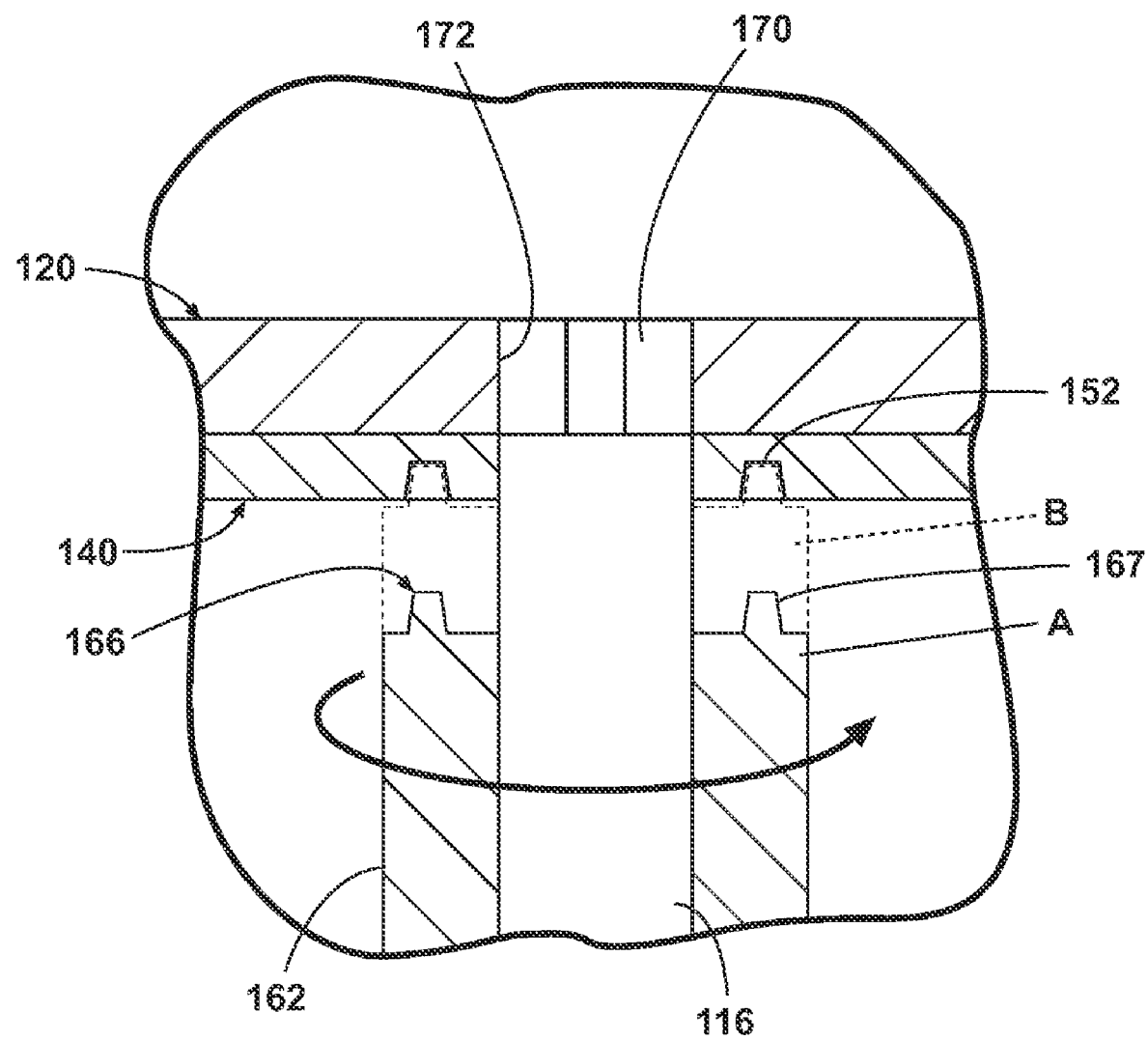
FIG. 7 is a partial schematic view of the food processor of FIG. 6.

Referring to FIG. 7, the coupling mechanism 166 includes a keyway hub 152 on the underside of the rotatable body 148, which mates with a complementary crown structure 167 on the upper end of the sleeve 162. The output shaft sleeve 162 may be rotationally fixed relative to the output shaft 116 such that the axial advancement of the output shaft sleeve 162 by the solenoid motor 164 causes the crown structure 167 to mate with the keyway hub 152, whereby the rotation of the output shaft 116 by the motor 114 will also rotate the rotatable body 148 to move a different dicing element into the food processing path 126.

A user may change which dicing element is in the food processing path 126 by operating the drive mechanism 160 through the control panel 136. First, the controller 132 signals the solenoid motor 164 to raise the output shaft sleeve 162 along the output shaft 116 until the crown structure 167 engages the keyway hub 152 of the rotatable body 148. The controller 132 then signals the motor 114 to rotate the drive shaft 142 and thus the output shaft 116 and output shaft sleeve 162 until a different dicing element is in the food processing path 126. Once the desired dicing element is moved into the food processing path 126, the solenoid motor 164 is deactivated to uncouple the crown structure 167 from the keyway hub 152.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention that is defined in the appended claims.

What is claimed is:

1. A food processor comprising:
    a receptacle configured to receive processed food;
    a food guide configured to receive food for processing and in communication with the receptacle to at least partially define a food processing path from the food guide to the receptacle;
    a cutting tool selectively movable through the food processing path to cut food as it passes through the food processing path;
    a dicing tool having multiple dicing elements selectively movable through the food processing path, between the cutting tool and the receptacle, to dice the food cut by the cutting tool; and
    a drive mechanism coupled to the dicing tool to selectively move the multiple dicing elements through the food processing path.

2. The food processor according to claim 1, wherein each of the multiple dicing elements are dicing grids comprising intersecting cutting elements defining openings.

3. The food processor according to claim 2, wherein each of the dicing grids are of different sizes as determined by the size of the openings.

4. The food processor according to claim 3, wherein the dicing tool is a rotatable disc and the dicing grids are formed in the disc.

5. The food processor according to claim 4, wherein the drive mechanism is one of an electric motor having a drive shaft coupled to the rotatable disc and a ratchet mechanism.

6. The food processor according to claim 5, wherein the cutting tool is a rotatable disc having at least one cutting blade.

7. The food processor according to claim 1, further comprising a housing in which the food processing path is located.

8. The food processor according to claim 7, wherein the housing comprises a bowl and a lid, which is removably mounted to the bowl, with the bowl defining the receptacle and the lid defining at least a portion of the food guide.

9. The food processor according to claim 1 wherein the drive mechanism is an electric motor and a coupler selectively coupling the electric motor to the cutting tool to move the cutting tool through the food processing path.

10. The food processor according to claim 9 wherein the drive mechanism further comprises a drive shaft coupling the electric motor to the cutting tool and the coupler comprises a sleeve slidable along the drive shaft, whereby slidable movement of the sleeve couples and uncouples the sleeve to the dicing tool and rotation of the drive shaft rotates the sleeve to move the dicing tool when the sleeve is coupled to the dicing tool.

11. The food processor according to claim 10 wherein the drive mechanism further comprises an actuator for slidably moving the sleeve relative to the drive shaft.

12. The food processor according to claim 1 wherein the drive mechanism is a manually-actuable lever coupled to the dicing tool.

13. The food processor according to claim 12 wherein the drive mechanism further comprises a ratchet mechanism coupling the lever to the dicing tool.

14. The food processor according to claim 13 wherein one of the lever and the ratchet mechanism has a predetermined range of motion indexed relative to the dicing elements to effect positioning the dicing elements within the food processing path.

15. A food processor comprising:
    a bowl terminating in a lip and defining a receptacle configured to receive processed food;
    a lid removably mounted to the bowl, with the bowl and lid collectively forming a food processing chamber in which the receptacle is located;
    a food chute in communication with the food processing chamber to at least partially define a food processing path from the food chute to the receptacle;
    a cutting tool located within the food processing chamber and selectively movable through the food processing path to cut food as it passes through the food processing path;
    a dicing tool carried by at least one of the bowl and lid and having multiple dicing elements selectively movable through the food processing path, between the cutting tool and the receptacle, to dice the food cut by the cutting tool; and
    a drive mechanism coupled to the dicing tool to selectively move the multiple dicing elements through the food processing path.

16. The food processor according to claim 15 wherein the dicing tool comprises a frame configured to mount to one of the bowl and lid, and a body rotatably mounted to the frame, with the dicing elements formed in the body.

17. The food processor according to claim 16 wherein the frame is a ring and the body is a disc.

18. The food processor according to claim 17 wherein at least a portion of the frame is received within the bowl.

19. The food processor according to claim 18 wherein the at least a portion of the frame is press-fit against the lip.

20. The food processor according to claim 17 wherein the cutting tool is a disc having at least one cutting blade.

21. The food processor according to claim 16 wherein the drive mechanism is an electric motor and a coupler selectively coupling the electric motor to the body to rotate the body.

22. The food processor according to claim 21 wherein the drive mechanism further comprises a drive shaft coupling the electric motor to the cutting tool and the coupler comprises a sleeve rotatably mounted to the drive shaft and slidable along the drive shaft, whereby rotation of the drive shaft rotates the sleeve and sliding of the sleeve couples and uncouples the sleeve to the body.

23. The food processor according to claim 22 wherein the drive mechanism further comprises an actuator for slidably moving the sleeve relative to the drive shaft.

24. The food processor according to claim 16 wherein the drive mechanism is a manually-actuable lever coupled to the body.

25. The food processor according to claim 24 wherein the drive mechanism further comprises a ratchet mechanism coupling the lever to the body.

26. The food processor according to claim 25 wherein the lever extends through aligned openings in the frame and the bowl.

27. The food processor according to claim 25 wherein one of the lever and the ratchet mechanism has a predetermined range of motion indexed relative to the dicing elements to effect positioning of the dicing elements within the food processing path.

* * * * *